United States Patent

[11] 3,616,356

| [72] | Inventor | Clarence H. Roy |
| | | 97 Dorman Road, Oxford, Conn. 06483 |
| [21] | Appl. No. | 668,427 |
| [22] | Filed | Sept. 18, 1967 |
| [45] | Patented | Oct. 26, 1971 |

[54] ELECTROLYSIS IN A PARTICULATE CARBON PACKING
21 Claims, 3 Drawing Figs.

[52] U.S. Cl. .................................................. 204/152, 204/149, 204/180 R
[51] Int. Cl. .................................................. C02b 1/82, B01d 43/00
[50] Field of Search .................................................. 204/149, 152, 97, 180, 302, 294, 180 I, 180 P, 186

[56] References Cited
UNITED STATES PATENTS

| 799,605 | 9/1905 | Lester | 204/302 X |
| 1,038,122 | 9/1912 | Hagg | 204/152 |
| 1,851,603 | 3/1932 | Thomas | 204/97 |
| 2,540,223 | 2/1951 | Tolman | 99/221 |
| 2,737,298 | 3/1956 | Hendel | 204/149 |
| 2,773,025 | 12/1956 | Ricks et al. | 204/149 |
| 2,864,750 | 12/1958 | Hughes, Jr. et al. | 204/149 |
| 3,379,637 | 4/1968 | O'Brien | 204/309 |
| 3,428,535 | 2/1969 | Putnam | 204/149 |
| 2,785,119 | 3/1957 | Cook et al. | 204/169 |

Primary Examiner—John H. Mack
Assistant Examiner—A. C. Prescott
Attorney—Delio and Montgomery ABSTRACT: This invention relates to the electrolytic treatment of water containing dissolved salts by means of a cell in which the anode and the cathode are separated by a particulate carbon packing. The electrolytic process precipitates metallic impurities as metal oxides, hydroxides, sulfides, etc., which may be filtered from the cell effluent and liberates gases as such. Process and apparatus serve for the purification of water and recovery of impurities.

PATENTED OCT 26 1971 3,616,356
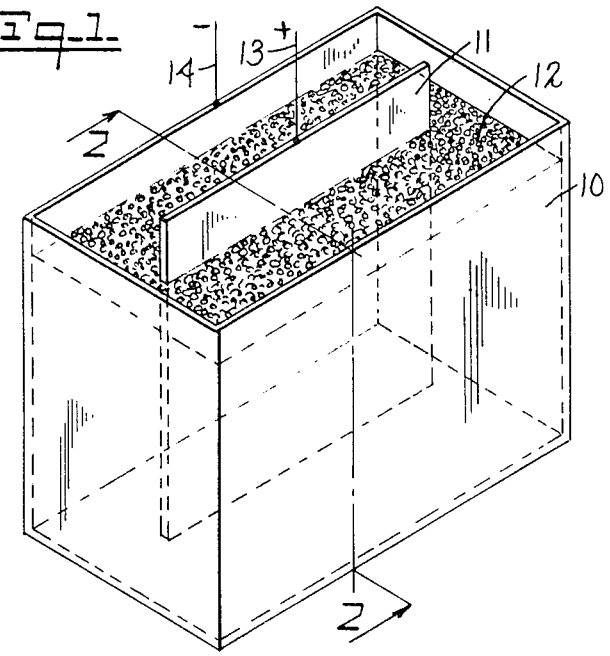
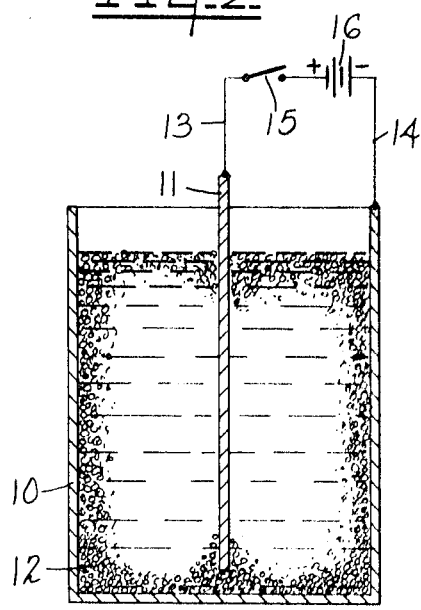
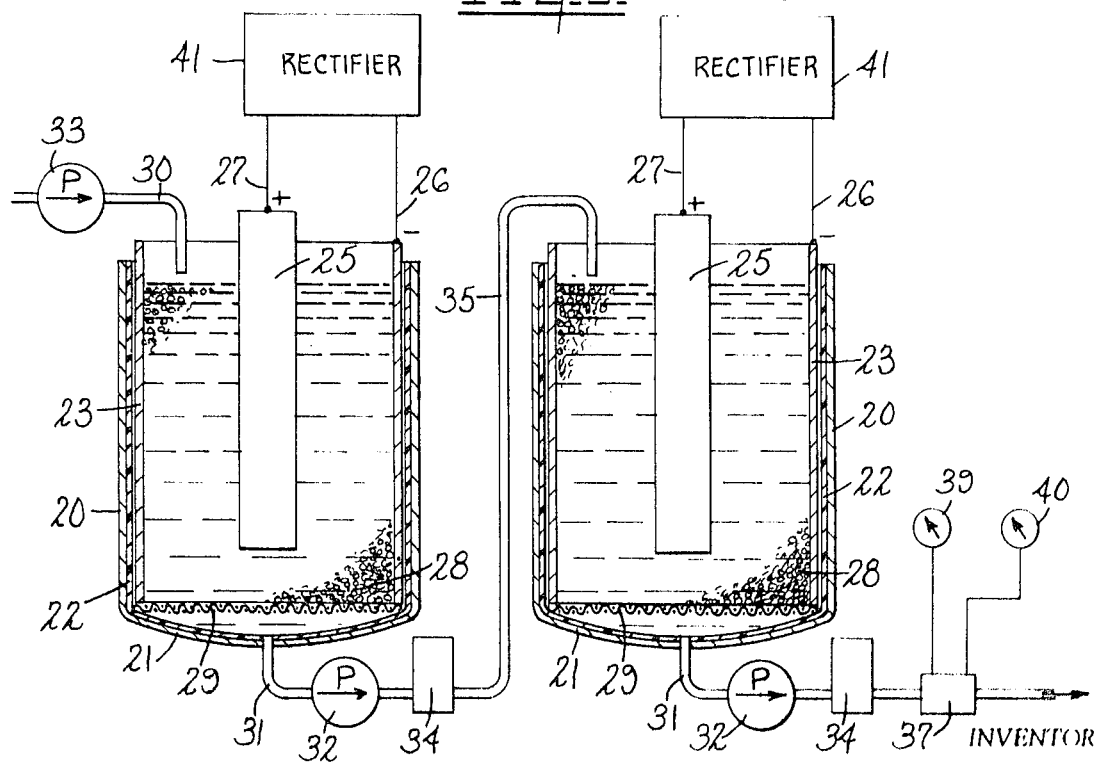
INVENTOR
Clarence H. Roy
BY
De Lio and Montgomery
ATTORNEYS

ELECTROLYSIS IN A PARTICULATE CARBON PACKING

This invention relates to a simplified process for the purification of water by electrolysis and the recovery therefrom of dissolved metallic impurities in the form of oxides, hydroxides, sulfides, or other water-insoluble products.

In view of the growing shortage of fresh water and the need to reduce contamination of streams with industrial wastes, the development of practical methods for the demineralization of water has received increasing attention in recent years. The major electrical methods now in use are electrodiaylsis in which the purification is effected by the electrical transfer of dissolved ions through membranes and demineralization by direct electrochemical means. The latter method generally involves the use of cation- and anion-responsive electrodes closely spaced so that they absorb cations and anions in a demineralization cycle and then give them up to a reject solution in a regeneration cycle. The electrodes are made up of finely divided carbon and are typically spaced at intervals of about 0.02 inches, the electrode pair voltage being about 0.5 volts. Waste cyanides in plating solutions are also removed by electrolytic oxidation alone and in the presence of sodium chloride with aeration to speed the oxidation process. Such processes are extremely slow at cyanide concentrations of less than 500 p.p.m. which is in the range of waste rinse water from cyanide-plating systems. Processes of this type are described by Nagendran et al. (Plating, p. 179, Feb. 1967).

It is a primary object of the present invention to provide an electrolytic method for the removal of dissolved salts from aqueous solution.

It is another object to provide a method by which dissolved impurities can be recovered from solutions by electrolysis.

It is a still further object to provide a simple electrolytic process for the removal of dissolved impurities from electroplating residues and recovery of the metals involved in the form of simple water-insoluble derivatives.

Still another object is the purification of sea water or brackish water by a simple electrolytic process.

It is an additional object to provide water purification processes by electrolysis that may be carried out in either batch or continuous manner.

Other objects and advantages of the invention will appear hereinafter.

The objects of this invention are attained by means of an electrolytic cell in which the anode and cathode are separated by a mass of particulate carbon wherein the individual carbon particles are at least about 1 millimeter in diameter and preferably 3 to 4 millimeters or larger. The spacing of the electrodes in the carbon bed is such that these are at least about 1 inch apart but may range to 6 to 8 inches or more. The electrodes may be made of any conductive material employed in the art but the anodes are preferably carbon or graphite and the cathodes are preferably iron or steel. The purification process which may be either batch or continuous is carried out by placing the solution to be purified in the cell and passing a current through the electrodes until the dissolved salts have been decomposed with precipitation of metal oxides, hydroxides, sulfides, etc. and liberation of gaseous products, such as chlorine when chlorides are involved. The liquid may then be removed from the cell and passed through a filter to remove the solid impurities, passed into a decantation tank for this purpose, or subjected to any satisfactory method of phase separation. The voltage applied across the electrodes is preferably about 5 to 25 volts but may be higher or lower depending on the aqueous solution being purified, the rate of purification desired, etc. Direct current is normally employed, but in some cases involving amphoteric metals, such as chromium, alternating current may be used. In general, the water to be purified should not contain more than about 5 weight percent of dissolved salts. High concentrations of metal salts, particularly solutions containing electroplatable metals, must be avoided since under these circumstances metal may be plated out on the carbon particles and electrodes. This defeats the purpose of the process since the impurities may not then be removed with the water and the plating of metal leads to short circuiting the cell and rendering the process completely inoperative.

It is critically essential to the successful operation of the process of this invention that the carbon particles be not in finely divided or powdered form since in this case the precipitated impurities cannot be separated from the carbon and the process becomes inoperative.

The method of this invention is particularly adapted to the purification of metal-containing rinses from electroplating baths, sea water, brackish waters, leach waters from mines, urine, and solutions contaminated with sewage. Excellent results have been obtained with rinses from metal cyanide baths, such as cadmium, gold, and zinc cyanide baths, hexavalent chrome baths, copper pyrophosphate baths, Watts-type nickel-plating baths which contain nickel sulfate, nickel chloride, and boric acid, tin salt baths and lead salt baths. The process has also proved successful for mixed bath rinses containing chromium, nickel and copper residues, etc. Chemical reagents of the type employed in the purification of contaminated water, e.g., oxidizing agents, reducing agents, etc., can be employed in conjunction with the process of this invention by merely adding these reagents to the electrolytic cell. Thus, sodium hypochlorite, formaldehyde, etc., which are used in the removal of cyanides from water, make it possible to accelerate or improve the electrolytic purification process in some instances. Sodium chloride may also be added in place of chlorine for electrolytic purification of cyanide baths as in the prior art. When employed as a continuous process one or more of the carbon-packed electrolytic cells may be used. Two or more may be employed in sequence in this connection.

The mechanism to which the process of this invention owes its utility is not exactly known. However, it is evident that the carbon particle packing serves as a resistance load between the electrodes and carries a small current. It is also probable that the separation carbon particles act as electric dipoles giving the effect of a multitude of small cells. Whatever the mechanism, it is evident that the carbon packing extends electrolytic action throughout the cell when it would otherwise be limited to the primary electrode surfaces. In addition, the active carbon itself assists in the purification as a catalyst and increases in utility with use. This may be due to additional catalytic activation resulting from impregnation with a small amount of the precipitated oxides, hydroxides, etc. Organic impurities are also apparently destroyed by oxidation or reduction in the process.

The detailed discussion of the invention may be best understood in connection with the drawings. FIG. 1 is a perspective drawing of the simple electrolytic cell of the invention.

FIG. 2 is a cross section of the cell of FIG. 1 along the plane 2—2.

FIG. 3 is a sectional view of an alternative form of the invention involving two cells which may be employed in series of continuous purification of water.

Referring particularly to FIG. 1 and FIG. 2, numerical 10 represents a rectangular steel tank which also serves as a cathode. Numeral 11 represents an anode which is suspended in the midportion of the cell and is supported and surrounded by carbon granules 12. Electric contacts 13 and 14 connect the electrodes to a source of rectified current 16 and switch 15 makes it possible to turn the current on or off. The aqueous solution to be purified is poured into the cell filling the interstices in the carbon packing and the current is turned on. The degree of purification is followed by the decrease of current as measured by an ammeter (not shown). The current gradually approaches that which would be due to the wet carbon resistance alone. The pH of the solution usually approaches neutrality from the alkaline or acid side depending on the original pH of the solution. The treated solution is then syphoned from the cell and filtered to remove the precipitated impurities.

FIG. 3 illustrates in cross section an installation comprising two electrolytic purification cells arranged in series. Each of these are made up of a metal tank 20 with a bell bottom 21 lined with an insulating layer of an elastomeric plastic 22. The cathode 23 is a steel cylinder of 20-gauge No. 304 stainless steel having approximately the same diameter as the tank. The graphite anode 25 is set in the center of the tank. A plastic screen 29 sits in the bottom of the tank and supports the carbon granular mass 28 which fills the tank. This mass consists of carbon pellets having a diameter of about 4 mm. and a length of about 6 to 8 millimeters. Cathode 26 and anode 27 connections lead to rectifier 41. The solution to be purified is pumped into the first cell through conduit 30 by means of pump 33 and the solution is removed through conduit 31 at the bottom. Screen 29 strains out carbon granules so that only treated water and precipitated impurities are removed. Pump 32 then impels the solution through cone filter 34. Conduit 35 then carries solution into the second identical electrolytic cell where the process is repeated to remove the remaining impurities. Liquid from the filter then passes through container 37 which holds electrodes for continually measuring pH by meter 39 and conductivity by meter 40. Similar devices (not shown) check the impure feed entering the system by conduit 30.

The carbon employed in the process is preferably an activated carbon obtained from a coconut, petroleum, bituminous or lignite base, etc. The following grades are illustrative.

|  | Grade | Mesh | Form |
| --- | --- | --- | --- |
| Columbia Activated Carbon | CXC | 4/6 | Pellets |
| Columbia Activated Carbon | JXC | 6/8 | Pellets |
| Columbia Activated Carbon | 3 CXC | 4/6 | Pellets |
| Pittsburg Activated Carbon | PCB | 4/6 | Granules |
| Pittsburgh Activated Carbon | BPL | 4/6 | Granules |
| Darco Activated Carbon |  | 4/6 | Granules |

The following examples are given to illustrate more fully the capabilities, advantages and practice of the invention and not by way of limitation:

EXAMPLE 1

A cylindrical mild steel container of approximately 1 liter capacity was charged with 400 ml. of Pittsburgh Activated Carbon BPL (4×6 mesh.). A small cylindrical graphite anode approximately one-quarter inch in diameter was centered in the carbon packing so that it did not contact the metal bottom of the container. Approximately 200 ml. of zinc cyanide rinse solution containing 300 –500 p.p.m. metal salt was then poured into the container and an electromotive force of 10 volts DC was applied across the container cathode and the graphite anode for 45 minutes. After this time the amperage of the cell dropped from an initial valve of 2 to 0.5. At the same time the pH, initially 12.4, dropped to 8.7. The liquid was then poured out of the cell and filtered to remove zinc hydroxide. The clear filtrate showed no residual cyanide by the prussian blue test.

EXAMPLE 2

A 600 ml. stainless steel beaker was packed with approximately 400 ml. of Columbia Activated Carbon CXC 4/6 and a 1-inch graphite anode was centered in the carbon mass. Approximately 300 ml. cadmium cyanide rinse water containing 300 –500 p.p.m. plating salts was then poured into the cell and an e.m.f. of 10 volts DC was applied across the graphite anode and the steel beaker cathode. The current was cut off after about 30 minutes when the initial amperage of 7 to 4. At this time the initial pH of 12.1 had dropped to 6.5. The solution after filtration to remove cadmium hydroxide gave a negative prussian blue test for cyanide.

A similar experiment in which 1 gram sodium chloride was added to the solution gave a negative cyanide test after 15 minutes. In this case the current dropped from 10 to 4 amperes and the final pH was 7.2.

EXAMPLE 3

A stainless steel beaker electrolysis cell was set up similar to that used in example 2 with Columbia Activated Carbon CXC 4/6 except that in this case the anode was a 2"×6"×⅛"sheet of stainless steel. To this cell was added 300 ml. of gold cyanide plating bath rinse water containing approximately 1,000 p.p.m. gold cyanide. An e.m.f. of 10 volts DC was applied across the cell for 30 minutes during which time the current dropped from 5 to 2 amperes. The treated solution was then filtered to remove a brownish black hydroxide which was dissolved in concentrated hydrochloric acid containing a small amount of nitric acid. On heating, the resultant solution yielded auric chloride and flakes of free gold on boiling to dryness. The filtrate solution from the electrolytic purification was almost colorless and did not smell of cyanide.

EXAMPLE 4

A cylindrical mild steel container of approximately 1-liter capacity was packed with 800 ml. Columbia Activated Carbon CXC 4/6 in which was centered a mild steel anode 2"×6"×⅛". The cell was then charged with 400 ml. sea water from West Haven, Conn. harbor having a density of 1.020. An e.m.f. of 10 volts DC was applied across the cell for 20 minutes. After this period the liquid removed from the cell was found to contain a copious grey precipitate which was readily removed by filtration to give clear water having a density of 1.005. This water was substantially free of any salty taste. Chlorine gas and bromine gas were obtained as byproducts from the cell.

A similar experiment carried out in the same cell without carbon packing resulted in corrosion of the anode to half its original size. The treated water showed no appreciable change in specific gravity.

EXAMPLE 5

A tandem 30-gallon tank apparatus of the type illustrated in FIG. 3 was filled with a chromate-plating solution rinse containing approximately 1,000 p.p.m. hexavalent chromium from an industrial chrome-plating process. This solution had a pH of 1.5 and was amber in color. A potential of 12 was applied across each of the two cells and after 15 minutes of static operation, solution was passed through the cells continuously at a rate of 1 gallon per minute. The amperage in the cells soon adjusted to a valve of 46–48 from an initially higher value. Fifty-five gallons of rinse water purified in this way left the system clear and colorless with a pH of 7.7–8.4 recovering chromium hydroxide in the filters. In this connection it should be noted that although the rinse solution was contaminated with kerosene, appearance and odor of the exit water indicated that kerosene was absent.

EXAMPLE 6

An electrolysis cell consisting of a stainless steel beaker having a capacity of 500 ml., a carbon packing consisting of 4×6 mm. pellets of Columbia Activated Carbon CXC, and a central stainless steel cathode approximately 2 inches by one eighth inch reaching to within about one-half inch of the bottom of the beaker was charged with approximately 250 ml. of a hexavalent chromium plating bath rinse containing about 250 p.p.m. chromic acid. This solution contained a small amount of sulfuric acid and had a pH of 1.3. An e.m.f. of 10 AC was then applied across the beaker walls and the central electrode for 10 minutes. The treated solution after filtration gave only a trace test for hexavalent chromium and had a pH of 4.5. The same results were obtained in a similar test using 3 volts AC in 15 minutes.

EXAMPLE 7

The effect of various additives in the purification of a zinc cyanide plating bath rinse containing 300–500 p.p.m. metal salt was studied using the electrolytic cell of example 6, 200 ml. of the zinc cyanide rinse being used in each experiment.

a. Approximately 10 ml. 37 percent commercial formaldehyde solution was added to the zinc cyanide in the cell which caused an immediate precipitation of zinc hydroxide. At this point the liquor still showed a fair cyanide test and had a pH of 12. After 20 minutes treatment with a potential of 10 volts DC, the filtered solution was found to be clear, colorless, cyanide free, and showed a pH of 7.

b. A 5 percent sodium hypochlorite solution was added in the amount of 15 ml. to the zinc cyanide rinse giving a cloudy solution having a pH of 12 and containing precipitate. This solution was then subjected to 8 volts DC and 10 amperes which gradually dropped to 5 amperes in the course of five minutes. The filtered solution from this treatment had a pH of 9 and gave no test for cyanide.

c. The effect of sodium chloride was tested in the above apparatus while using a small carbon anode in place of the stainless steel one. Two grams of sodium chloride were added to the cyanide solution and a potential of 10 volts DC was applied. The current was initially 5 amperes which fell to 2 amperes in 10 minutes. The resultant solution, when freed of zinc hydroxide precipitate, had a pH of 8 and was cyanide free. A similar purification was obtained in 3 minutes at 8 DC and 3 amperes when 8.5 grams of sodium chloride were added to the zinc cyanide solution. In this case the pH of the purified solution was 7.

EXAMPLE 8

An electrolysis cell consisting of 500 ml. stainless steel beaker was packed with 4×6 m.m. pellets of Columbia Activated Carbon CXC and a 1"×1"square graphite anode was inserted therein. To this was added 250 ml. of a solution of lead nitrate containing 1000 p.p.m. dissolved lead. A voltage of about 10 volts DC was applied across the cell. The amperage fell from 7 to 3 amperes in about 5 minutes. The solution was then taken from the cell and the white precipitate of lead hydroxide removed by filtration.

EXAMPLE 9

To the electrolysis cell of example 8 was added about 250 ml. of a stannous chloride solution containing about 1000 p.p.m. dissolved tin acidified with hydrochloric acid to maintain clarity. A voltage of about 10 volts was applied across the cell. The amperage fell from 10 to 3 in 10 minutes. The pH rose from an initial value of 1 to 6.9. The solution was then removed from the cell and filtered to remove a slightly grey precipitate. The colorless filtrate gave a negative test for stannous ion.

EXAMPLE 10

To the electrolysis cell of example 8 was added 250 ml. of urine and a voltage of about 10 volts was applied across the cell. After foaming which subsides in about 15 minutes, the electrolysis was continued for about 45 minutes. The solution was then removed and filtered free of grey precipitate to give a substantially colorless and odorless fluid. The pH changed from an initial value of 7.0 to 7.6 and the specific gravity fell from 1.018 to 1.002.

Although the above examples illustrate the utility of the subject process as a means of purifying water, it should be noted that the process may also be adapted to the recovery of metal, gases, and other elements from salt solutions.

It is also to be understood that the following claims are intended to cover all of the generic and specific features of the invention herein described, and all statements of the scope of the invention which, as a matter of language, might be said to fall therebetween.

What is claimed is:

1. An electrolytic process for removing dissolved inorganic and organic matter from an aqueous solution containing said inorganic and organic matter, comprising electrolyzing said solution between electrodes in a packed bed of carbon particles, said bed being continuous between the electrodes, said particles having a size of at least 1 by 1 millimeters, wherein the space between said electrodes is at least about 1 inch and the voltage differential across said electrodes is at least about 1 volt, said electrolysis being continued until decomposition products are formed, and separating any precipitate which may form from the aqueous phase.

2. The process of claim 1 wherein the electrodes consist of a carbon anode and a stainless steel cathode and wherein said aqueous solution contains no more than 5 percent of impurities comprising dissolved metals in salt form.

3. The process of claim 1 wherein the lines of force converge from one electrode surface to the other.

4. The process of claim 2 wherein said dissolved metals in salt form are compounds selected from the group consisting of metal cyanides, alkali metal chromates, chromic acid, iron salts, nickel salts, lead salts, tin salts, the salt content of urine and the salt content of sea water.

5. The process of claim 4 wherein the voltage differential across the electrodes is in the range of about 1 to 25 volts DC.

6. A process for the purification of an aqueous solution containing impurities comprising dissolved metal salts, which comprises electrolyzing said solution between a pair of electrodes spaced at least about one inch apart wherein the space between the electrodes is continuously packed with carbon particles having a size of at least one by one millimeters and wherein the voltage differential across said electrodes is at least about 1 volt, said electrolysis being continued until decomposition products are formed.

7. The process of claim 6 wherein said impurities contain organic matter.

8. The process of claim 6 wherein said aqueous solution contains no more than 5 percent by weight of dissolved metal salts and wherein the anode electrode is carbon or graphite and the cathode electrode is iron or stainless steel.

9. The process of claim 8 including the step of separating the phases produced by said electrolysis.

10. The process of claim 9 wherein said phase separation is effected by filtering the electrolyzed solution.

11. The process of claim 10 wherein before filtering, said electrolyzed solution is passed through a strainer effective to remove said carbon particles.

12. The process of claim 6 wherein the lines of force converge from one electrode surface to the other.

13. The process of claim 8 wherein the voltage differential is no more than about 25 volts DC.

14. The process of claim 8 wherein the metal salts are selected from salts of zinc, cadmium, gold, chromium, lead, tin, nickel, the metal salt content of sea water, and the metal salt content of urine.

15. The process of claim 8 wherein the metal salts are selected from zinc cyanide, cadmium cyanide, gold cyanide, lead nitrate, and stannous chloride.

16. The process of claim 6 wherein the aqueous solution is sea water.

17. The process of claim 8 wherein the aqueous solution comprises the rinsings from a chrome plating bath containing hexavalent chromium.

18. The process of claim 17 wherein the pH of the aqueous solution subjected to electrolysis is about 1.3.

19. The process of claim 8 wherein the aqueous solution contains urine.

20. A process for removing dissolved inorganic matter from the rinsings of an aqueous hexavalent chrome plating bath comprising electrolyzing said rinsings in a packed bed of carbon particles having a size of at least 1 by 1 millimeters between electrodes wherein the space between said electrodes is at least about 1 inch and the bed of carbon particles is a continuous bed between the electrodes, and the voltage differential across said electrodes is at least about 1 volt AC, and separating any precipitate which may form from the aqueous phase of purified water.

21. The process of claim 20 wherein the electrodes are selected from the group consisting of stainless steel and graphite electrodes.

Notice of Adverse Decision in Interference

In Interference No. 98,259, involving Patent No. 3,616,356, C. H. Roy, ELECTROLYSIS IN A PARTICULATE CARBON PACKING, final judgment adverse to the patentee was rendered Sept. 17, 1976, as to Claims 1-3.

[*Official Gazette, April 29, 1980.*]